US012480411B2

(12) United States Patent
Postec et al.

(10) Patent No.: US 12,480,411 B2
(45) Date of Patent: Nov. 25, 2025

(54) PROPELLER BLADE OR VANE HAVING A HOLLOW COMPOSITE ROOT

(71) Applicants: SAFRAN AIRCRAFT ENGINES, Paris (FR); SAFRAN, Paris (FR)

(72) Inventors: Clément Pierre Postec, Moissy-Cramayel (FR); Vincent Lionel René Maison, Moissy-Cramayel (FR); Pierre Jean Faivre D'arcier, Moissy-Cramayel (FR); Mattéo Minervino, Moissy-Cramayel (FR); François Charleux, Moissy-Cramayel (FR)

(73) Assignees: SAFRAN AIRCRAFT ENGINES, Paris (FR); SAFRAN, Paris (FR)

( * ) Notice: Subject to any disclaimer, the term of this patent is extended or adjusted under 35 U.S.C. 154(b) by 0 days.

(21) Appl. No.: 19/110,263

(22) PCT Filed: Sep. 4, 2023

(86) PCT No.: PCT/FR2023/051326
§ 371 (c)(1),
(2) Date: Mar. 10, 2025

(87) PCT Pub. No.: WO2024/056959
PCT Pub. Date: Mar. 21, 2024

(65) Prior Publication Data
US 2025/0257663 A1    Aug. 14, 2025

(30) Foreign Application Priority Data

Sep. 13, 2022   (FR) ..................................... 2209179

(51) Int. Cl.
*F01D 5/28* (2006.01)
*B29C 70/24* (2006.01)
(Continued)

(52) U.S. Cl.
CPC .............. *F01D 5/282* (2013.01); *B29C 70/24* (2013.01); *B64C 11/26* (2013.01); *F01D 5/30* (2013.01);
(Continued)

(58) Field of Classification Search
CPC ... F01D 5/14; F01D 5/22; F01D 5/282; F01D 5/30; B29C 70/24
See application file for complete search history.

(56) References Cited

U.S. PATENT DOCUMENTS

| 5,222,297 A * | 6/1993 | Graff ..................... B29C 70/865 |
| | | 29/889.7 |
| 9,162,750 B2 * | 10/2015 | Coupe .................... B64C 11/26 |

(Continued)

FOREIGN PATENT DOCUMENTS

WO    WO 2006/136755 A2    12/2006

OTHER PUBLICATIONS

Written Opinion of theInternational Searching Authority as issued in International Patent Application No. PCT/FR2023/051326, dated Dec. 22, 2023.

(Continued)

*Primary Examiner* — Courtney D Heinle
*Assistant Examiner* — Cameron A Corday
(74) *Attorney, Agent, or Firm* — Pillsbury Winthrop Shaw Pittman LLP

(57) ABSTRACT

A propeller blade or airfoil for a turboprop engine made from composite material including a matrix-densified fibrous reinforcement, the propeller blade or airfoil including, in the direction of its span, a root and an aerodynamic profile. The fibrous reinforcement includes a fibrous preform having three-dimensional weaving with a root preform portion and an aerodynamic profile preform portion. The fibrous preform includes a separation delimiting a recess that forms (Continued)

a cavity extending both into the root and into the aerodynamic profile. A spar is present in the cavity, the spar including an aerodynamic profile shaping portion positioned in a first portion of the cavity and a root shaping portion positioned in a second portion of the cavity. The root has a rotationally symmetric shape.

11 Claims, 7 Drawing Sheets

(51) Int. Cl.
    *B64C 11/26*     (2006.01)
    *F01D 5/30*     (2006.01)
    *B29L 31/08*     (2006.01)

(52) U.S. Cl.
    CPC ..... *B29L 2031/087* (2013.01); *F05D 2230/23* (2013.01); *F05D 2300/6034* (2013.01)

(56) References Cited

U.S. PATENT DOCUMENTS

| | | | | |
|---|---|---|---|---|
| 9,457,435 | B2* | 10/2016 | Mathon | B29C 70/86 |
| 9,920,629 | B2* | 3/2018 | Nagle | F01D 5/14 |
| 2006/0257260 | A1 | 11/2006 | Dambrine et al. | |
| 2013/0017093 | A1 | 1/2013 | Coupe et al. | |
| 2013/0177422 | A1* | 7/2013 | Bianchi | F01D 5/147 |
| | | | | 416/146 R |
| 2013/0343898 | A1* | 12/2013 | Folsom | B64C 11/24 |
| | | | | 29/889.71 |
| 2016/0159460 | A1* | 6/2016 | Laurenceau | B29D 99/0025 |
| | | | | 264/103 |
| 2019/0217943 | A1* | 7/2019 | Courtier | B29C 70/545 |
| 2019/0323357 | A1* | 10/2019 | Courtier | B64C 11/30 |

OTHER PUBLICATIONS

International Search Report as issued in International Patent Application No. PCT/FR2023/051326, dated Dec. 22, 2023.

* cited by examiner

[Fig. 1]
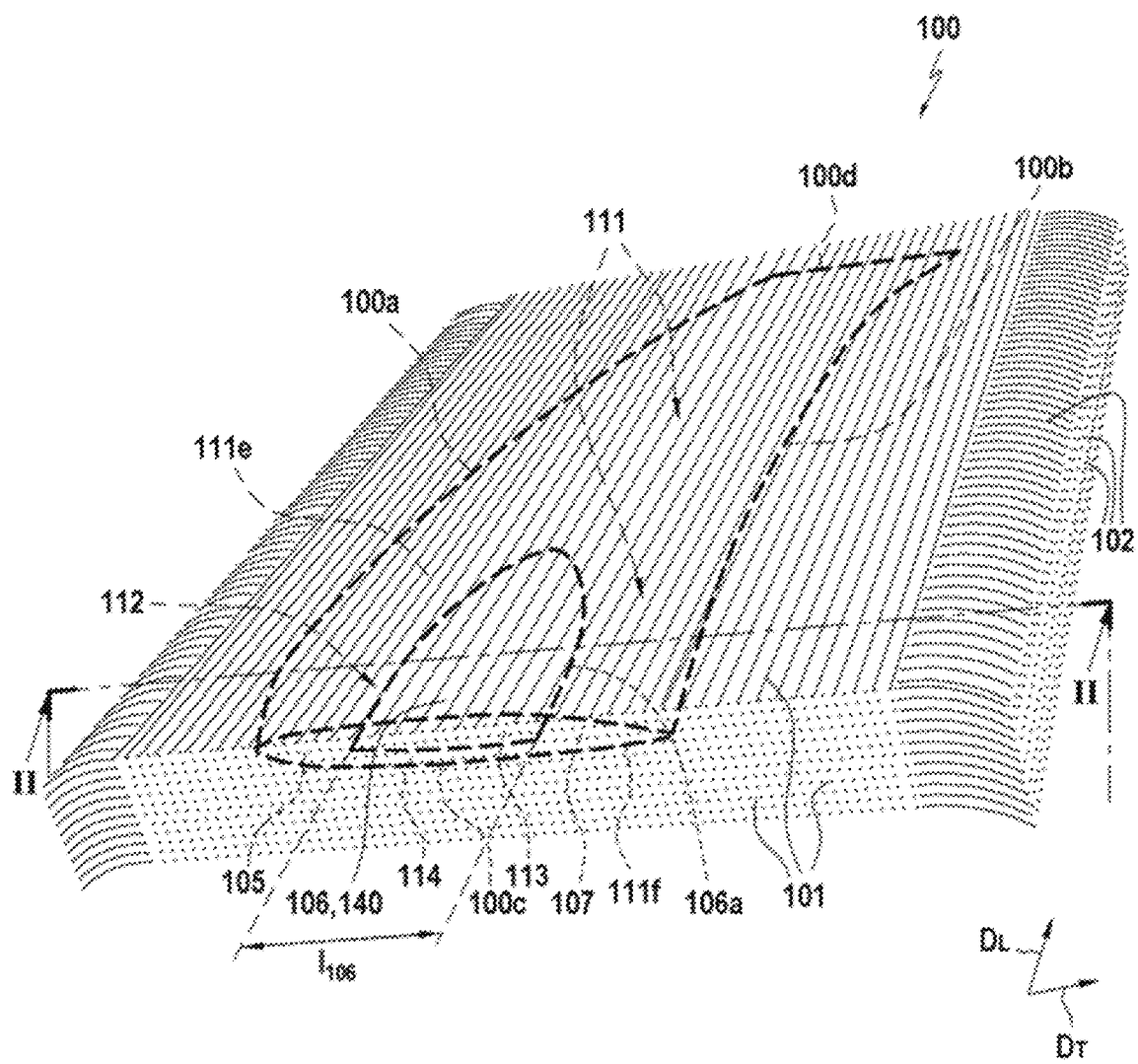

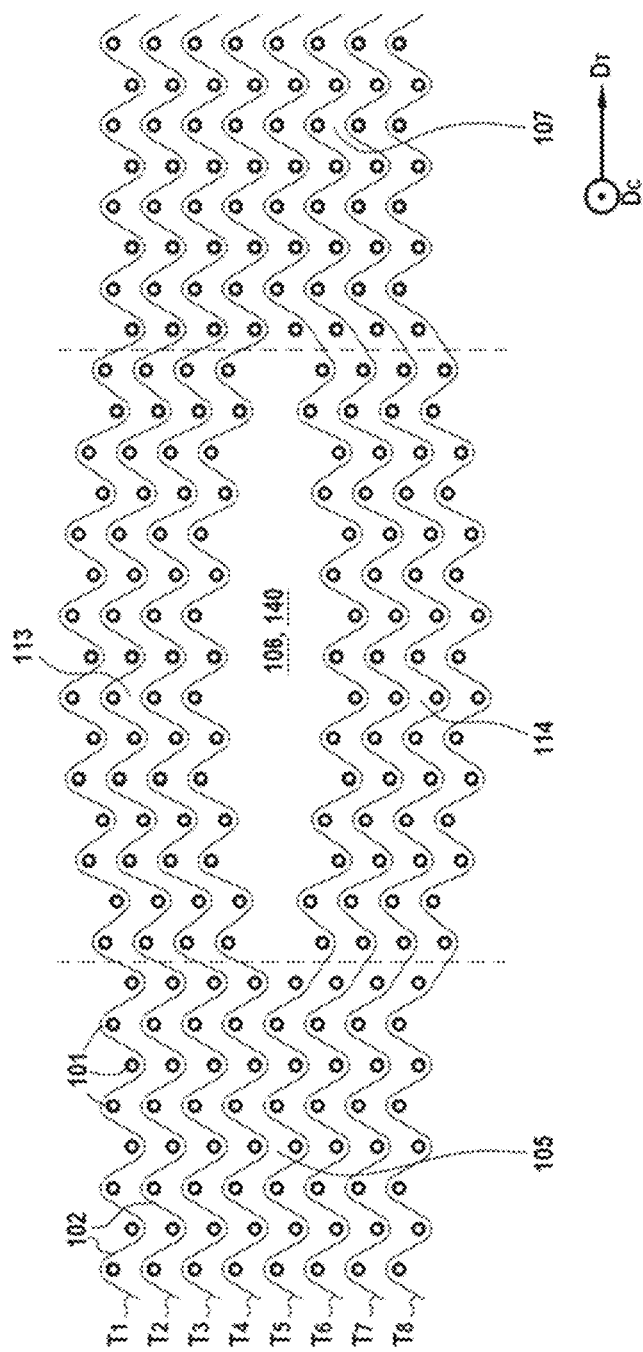

[Fig. 3]
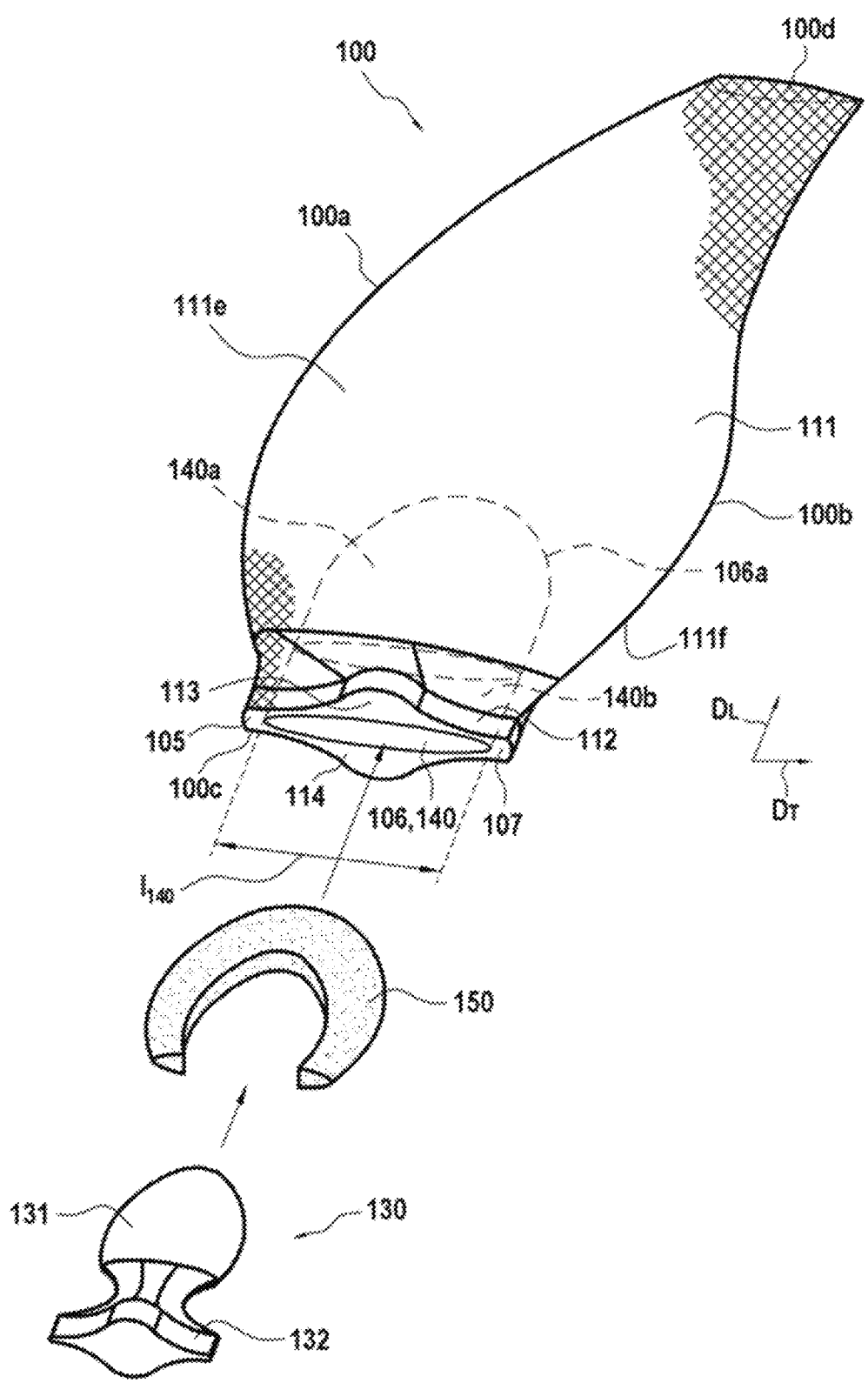

[Fig. 4]
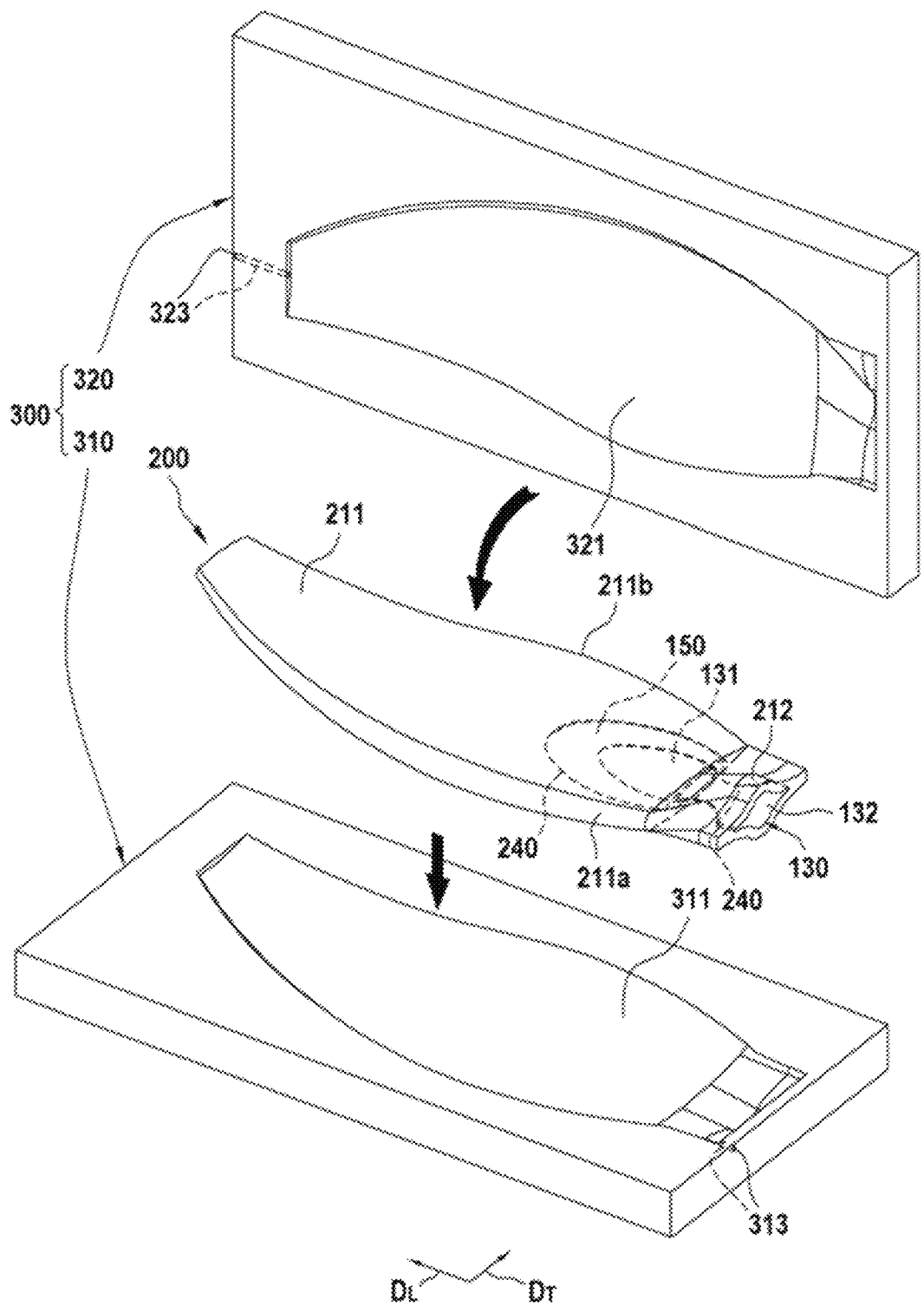

[Fig. 5]
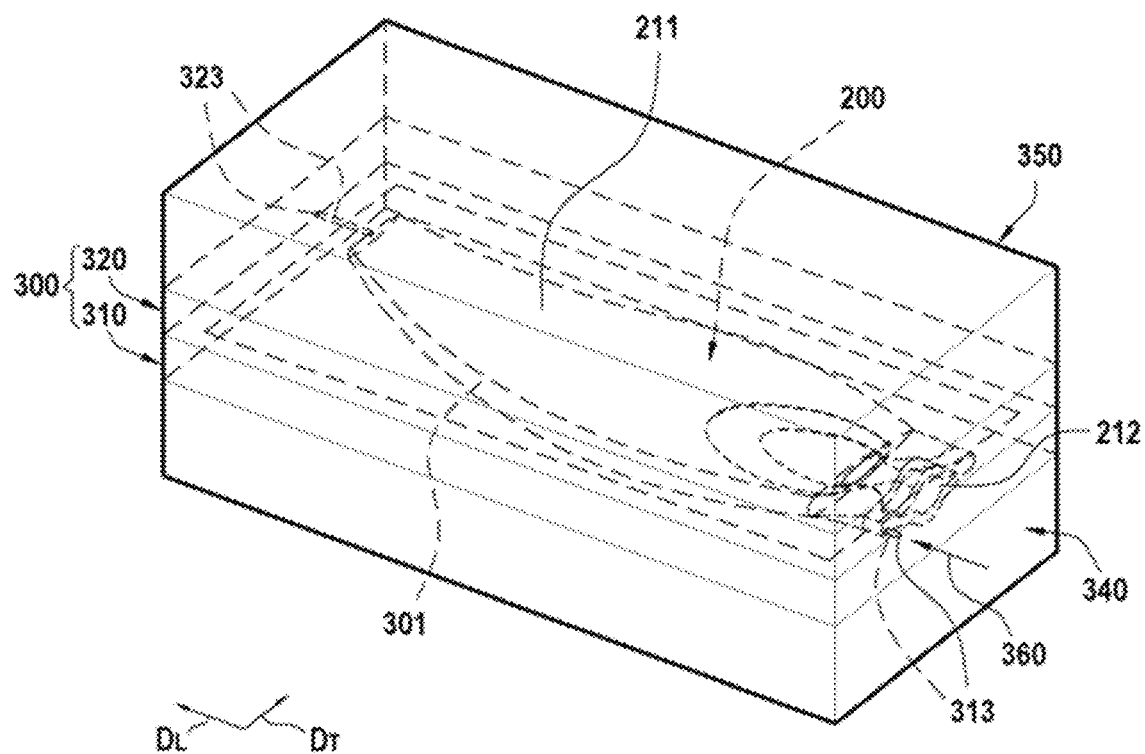

[Fig. 6]
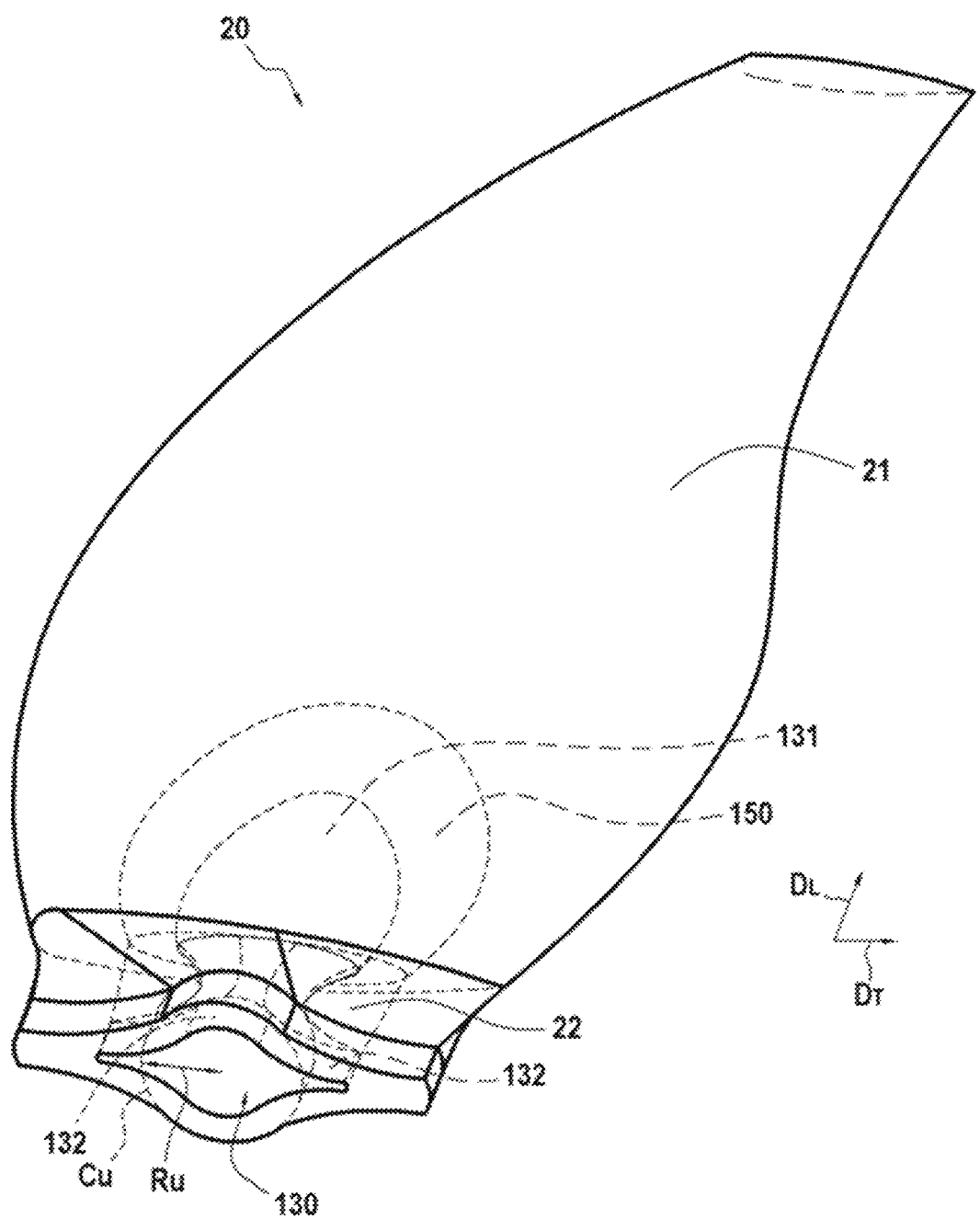

[Fig. 7]
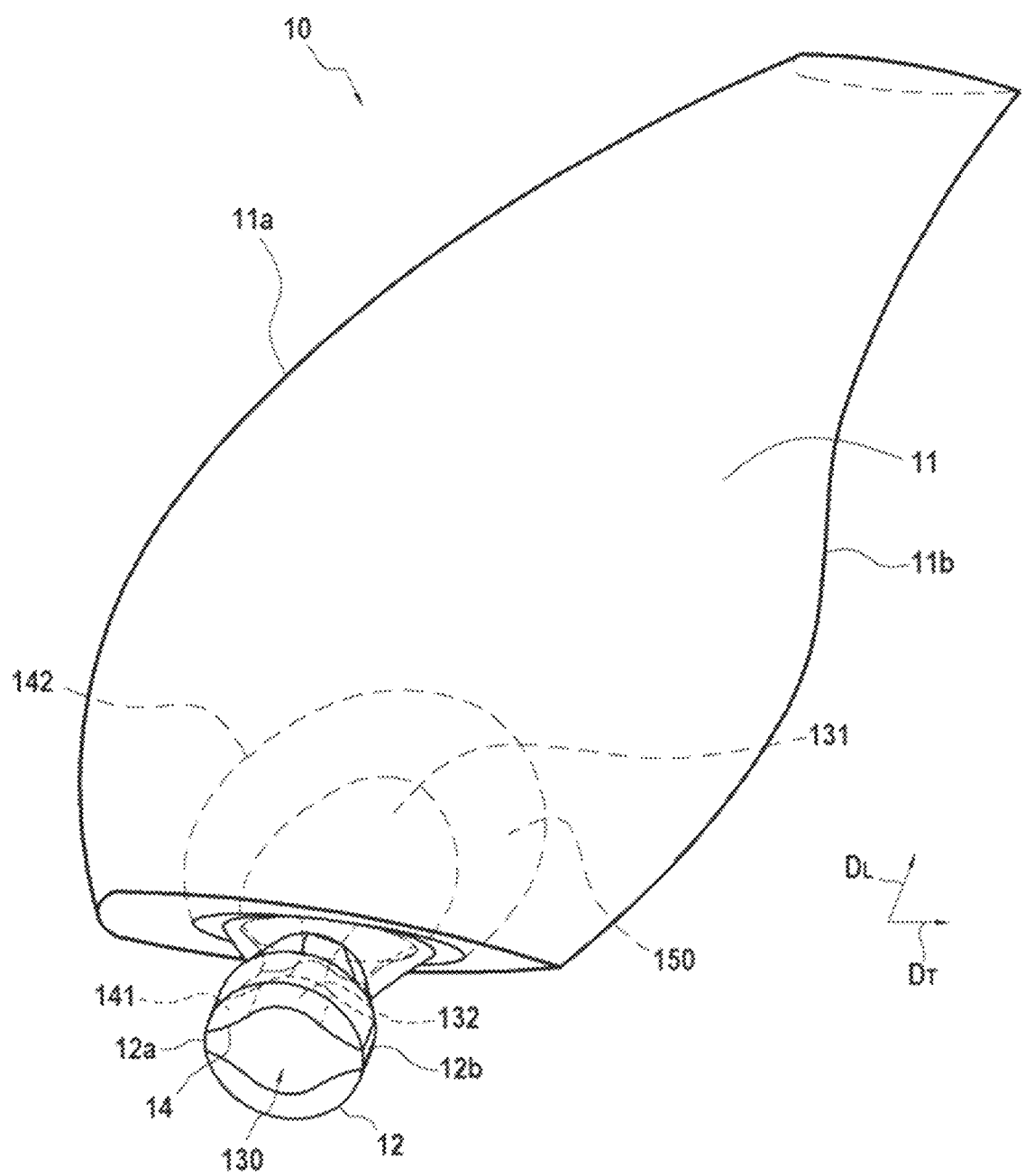

PROPELLER BLADE OR VANE HAVING A HOLLOW COMPOSITE ROOT

CROSS-REFERENCE TO RELATED APPLICATIONS

This application is the U.S. National Stage of PCT/FR2023/051326, filed Sep. 4, 2023, which in turn claims priority to French patent application number 22 09179 filed Sep. 13, 2022. The content of these applications are incorporated herein by reference in their entireties.

TECHNICAL FIELD

The present invention relates to the field of propeller blades or airfoils for aircraft, such as those present on turboprop engines.

Prior Art

Propeller blades or airfoils for turboprop engines are generally made of metal material. Although metal propeller blades or airfoils have good mechanical strength, they have the disadvantage however of a relatively large mass.

In order to obtain more lightweight propeller blades or airfoils, it is known to produce propeller blades made from composite material, in other words by producing structural parts with matrix-densified fibrous reinforcement.

Document US 2013/0017093 describes the production of a propeller blade from a fibrous structure with aerodynamic profile inside of which a portion of a spar is introduced, one end of the spar being prolonged by a bulging portion intended to form the root of the propeller blade.

The new generation of engines requires more compact blade or airfoil roots. This need arises from the necessity of being able to pivot the blade or airfoil around its vertical axis in order to adapt its angle of attack to the flight regime (blade or airfoil with variable pitch). This need, combined with the fact that the blade or airfoil must be incorporated as low as possible on the disc, makes it necessary to significantly reduce the size of the root.

For this purpose, the roots of new generation blades or airfoils have an axisymmetric or substantially axisymmetric shape and reduced dimensions in contrast to the roots of the prior art as described in document US 2013/0017093 which extend over the entire width of the lower portion of the blade or airfoil.

This axisymmetric or quasi-axisymmetric shape is more difficult to manufacture from composite material, in particular when three-dimensional (3D) weaving is used to form the fibrous reinforcement of the blade or airfoil.

Furthermore, the mechanical loads to which new generation roots are subjected impose additional constraints. More specifically, in addition to the usually encountered mechanical traction and bending loads (caused respectively by centrifugal forces and impacts with objects), new generation roots can be incorporated in the disc of the rotor using metal shells, which results in an additional mechanical loading in circumferential compression.

DISCLOSURE OF THE INVENTION

It is therefore desirable to propose a solution for producing aircraft propeller blades or airfoils made from composite material with a compact root and able to withstand various mechanical loads.

For this purpose, the present invention proposes a method for manufacturing a propeller blade or airfoil for a turboprop engine, made from composite material comprising a matrix-densified fibrous reinforcement, the method comprising:
  producing, by three-dimensional weaving, a fibrous blank as a single piece, the fibrous blank having a flat shape extending in a longitudinal direction and a transverse direction respectively corresponding to the direction of its span and to the chord direction of the propeller blade or airfoil to be manufactured, the fibrous blank comprising a root portion and an aerodynamic profile portion extending in the longitudinal direction from the root portion and in the transverse direction (DT) between a leading-edge portion and a trailing-edge portion,
  the shaping of the fibrous blank to obtain a single-piece fibrous preform having said aerodynamic profile portion forming an aerodynamic profile preform, and said root portion forming a root preform, and
  the densification of the fibrous preform by a matrix in order to obtain an intermediate part made of composite material having a fibrous reinforcement constituted by the fibrous preform and densified by the matrix, the intermediate part comprising an aerodynamic profile portion and a root portion,
  characterised in that the root portion of the fibrous blank comprises a separation delimiting an inner recess extending both into the root portion and into the aerodynamic profile portion of the fibrous blank, the inner recess opening at a lower portion of the fibrous blank, in that the shaping of the fibrous blank comprises the insertion of a spar into the inner recess, the spar comprising an aerodynamic profile shaping portion positioned in the aerodynamic profile portion of the fibrous blank and a root shaping portion positioned in the root portion of the fibrous blank, in such a way as to respectively form an aerodynamic profile preform portion and a root preform portion, and in that the method further comprises, after the densification step, a machining step of the root portion of the intermediate part made of composite material along a determined radius in such a way as to former a propeller blade or airfoil comprising a root having a rotationally symmetric shape and an aerodynamic profile.

The method of the invention thus makes it possible to produce a propeller airfoil or a blade with a composite root which is both compact and perfectly adapted to withstanding the various mechanical loadings described above. More specifically, the fibrous reinforcement portion of the root is produced by 3D weaving and has a rotationally symmetric shape which is connected to the fibrous reinforcement portion of the aerodynamic profile at its centre. A composite root is thus obtained which is much more compact than that of the prior art which generally extends over the entire width of the lower portion of the aerodynamic profile. In this composite root, there are yarns, for example warp yarns, oriented in the direction of the span of the airfoil or blade which give it good mechanical strength in traction and in bending, by combination with the 3D weave. In addition, in the root composite, there are yarns, for example weft yarns, oriented in the chord direction of the airfoil or blade which give this good mechanical strength in circumferential compression.

Furthermore, the rotationally symmetric shape of the root is compatible with integration into a propeller rotation or pitch change system.

By inserting a spar in the fibrous reinforcement in which a root portion is integrally formed, in other words woven in a single piece, with an aerodynamic profile portion, very good mechanical strength of the entire part is ensured and, in particular, with regard to the forces to which the root may be subjected.

According to one aspect of the invention the separation present in the root portion of the fibrous blank and the root shaping portion of the spar have, in the transverse direction, a width greater than the machining radius of the root portion of the intermediate part made from composite material. This enables the entire spar to pass through the root portion of the fibrous blank.

According to another aspect of the method of the invention, the spar is made from composite material comprising a matrix-densified fibrous reinforcement or made of metal material.

According to another aspect of the method of the invention, the shaping of the fibrous blank further comprises the insertion of a shaping part made of rigid cellular material around the aerodynamic profile shaping portion of the spar.

According to another aspect of the method of the invention, the shaping of the fibrous blank further comprises the injection of an expansive material around the aerodynamic profile shaping portion of the spar.

Another object of the invention is a propeller blade or airfoil for a turboprop engine made from composite material comprising a matrix-densified fibrous reinforcement, the propeller blade or airfoil comprising, in a direction of its span, a root and an aerodynamic profile, the root and the aerodynamic profile extending in a chord direction between a leading edge and a trailing edge, the fibrous reinforcement comprising a fibrous preform having a three-dimensional weaving with a root preform portion present in the root and an aerodynamic profile preform portion present in the aerodynamic profile, the preform portions of root and aerodynamic profile being connected to one another by the three-dimensional weave, characterised in that the fibrous preform comprises a separation delimiting a recess forming a cavity extending both into the root and into the aerodynamic profile, in that a spar is present in the cavity, the spar comprising an aerodynamic profile shaping portion positioned in a first portion of the cavity and a root shaping portion positioned in a second portion of the cavity, and in that the root of the propeller blade or airfoil has a rotationally symmetric shape.

According to an aspect of the propeller blade or airfoil of the invention, the root shaping portion of the spar is exposed at the leading edge and the trailing edge of the root of the propeller blade or airfoil, the remainder of the root shaping portion of the spar being covered by the fibrous preform.

According to another aspect of the propeller blade or airfoil of the invention, the spar is made from composite material comprising a matrix-densified fibrous reinforcement or made of metal material.

The invention further relates to an aeronautical engine comprising a plurality of propeller blades or airfoils according to the invention, as well as to an aircraft comprising at least one such engine.

BRIEF DESCRIPTION OF THE DRAWINGS

FIG. 1 is a schematic view illustrating the 3D weave of a fibrous blank for manufacturing a blade, FIG. 2 is an enlarged scale cross-sectional view in the weft direction of an assembly of layers of yarns, showing the formation of a separation in the root portion of the blank of FIG. 1 along a section plane II-II, FIG. 3 is a schematic view in perspective showing the shaping of a root preform portion and an aerodynamic profile preform portion in the fibrous blank of the FIG. 1, FIG. 4 is an exploded perspective schematic view showing an injection tool and the placing of the fibrous preform therein, according to an embodiment of the invention, FIG. 5 is a schematic view in perspective showing the injection tool of FIG. 4 closed, FIG. 6 is a schematic view in perspective of an intermediate part made from composite material obtained in accordance with an embodiment of the invention, FIG. 7 is a schematic view in perspective of a blade made from composite material obtained after machining the root portion of the intermediate part of FIG. 6.

DESCRIPTION OF EMBODIMENTS

The invention is applicable, in general, to various types of propeller blades or airfoils used in aircraft engines. The invention has an advantageous but non-exclusive application in large-size propeller blades or airfoils, which are intended to be incorporated in pivoting or variable pitch systems. Such propeller blades or airfoils are, in general, provided with a so-called "cylindrical" root, in other words having a rotationally symmetric shape and good resistance with respect to traction, bending and circumferential compression forces. The blade according to the invention can constitute, in particular, a blade for shrouded moving wheels such as fan blades or a blade for unshrouded moving wheels such as in so-called "open rotor" aircraft engines.

In the remainder of the description, the exemplary embodiments are described in relation to blades for a turboprop engine. However, the exemplary embodiments also apply to aircraft propeller airfoils.

FIG. 1 shows, highly schematically, a fibrous blank 100 intended to form the fibrous preform of a blade to be produced.

The fibrous structural blank 100 is obtained, as schematically illustrated in FIG. 1, by three-dimensional (3D) weaving carried out in known manner using a jacquard-type loom on which a bundle of warp yarns 101 or strands has been arranged in a plurality of layers of several hundred yarns each, the warp yarns being linked by a weft yarns 102. The fibrous structural blank 100 is woven in a single piece, the blank extending in a longitudinal direction $D_L$, corresponding to the direction of span of the blade to be manufactured, between a lower portion 100c and a upper portion 100d and in a transverse direction $D_T$, corresponding to the chord direction of the blade to be manufactured, between a front edge 100a and a rear edge 100b, the blank comprising an aerodynamic profile portion 111 defining two faces 111e and 111f intended to respectively form the suction and pressure faces of the blade, and a root portion 112 intended to subsequently form a blade root and extending to the outside of the aerodynamic profile blank 111 in the longitudinal direction $D_L$ and set back from the front and rear edges 100a and 100b in the transverse direction $D_T$.

Here, the term "three-dimensional weaving" or "3D weaving" shall mean a weaving method by which at least some warp yarns link weft yarns over a plurality of weft layers, for example an "interlock weave". Here, the term "interlock" weave means a weave in which each layer of weft yarns links a plurality of layers of warp yarns with all the yarns of the same weft column having the same movement in the weave plane.

Other types of known three-dimensional weaving could be used such as, in particular, those described in document WO 2006/136755, the content of which is incorporated here by reference. This document describes, in particular, the production by weaving in a single piece of fibrous reinforcement structures for parts such as blades, having a first type of core weave and a second type of skin weave which can confer both the mechanical and aerodynamic properties expected for this type of part.

The fibrous blank according to the invention can be woven, in particular, from carbon fibre or ceramic yarns, such as silicon carbide.

Over the course of the weaving of the fibrous blank, for which the thickness and the width vary, a certain number of warp yarns are not woven, which makes it possible to define the desired continuously variable contour and thickness of the blank 100. An example of progressive 3D weaving enabling, in particular, the thickness of the blank to vary between a first edge intended to form the leading edge and a second edge of lesser thickness and intended to form the trailing edge is described in document US 2006/257260.

In accordance with the invention, during the weaving, a separation 106 is produced inside the fibrous blank 100 between two successive layers of warp yarns. The separation 106 extends in a plane parallel to the surface of the fibrous blank and over an area of separation delimited by a contour 106a locally separating the fibrous blank 100 into two woven portions 113 and 114. In the longitudinal direction $D_L$, the separation 106 passes through the root portion 112 of the fibrous blank 100 and partially penetrates into the aerodynamic profile portion 111 of the fibrous blank 100. In addition, the separation 106 extends in the transverse direction $D_T$ between the front edge 100a and the rear edge 100b of the blank 100 and set back from these edges, in other words the separation 106 does not open on the front 100a and rear 100b edges in such a way as to preserve linking portions 105 and 107 respectively adjacent to the front edge 100a and the rear edge 100b. The separation 106 opens, in addition, at the lower portion 100c. The separation 106 thus forms an inner recess 140 which is accessible via the lower portion 100c.

A 3D weaving mode with interlock weave of the blank 100 is shown schematically by FIG. 2. FIG. 2 is an enlarged partial view of a warp section plane in a portion of the blank 100 comprising the area of separation 106 (section II-II in FIG. 1). In this example, the blank 100 comprises 8 layers of warp yarns 101 extending substantially in the longitudinal direction $D_L$. In FIG. 2, the 8 layers of warp yarns are linked by weft yarns $T_1$ to $T_8$ in the connection zones 105 and 107 of the fibrous blank 100, the weft yarns extending substantially in the transverse direction $D_T$. At the separation 106, the woven portion 113 comprises 4 layers of warp yarns 101 connected together by 4 weft yarns $T_1$ to $T_4$ while the woven potion 114 comprising the 4 layers of warp yarns forming the set of layers of yarns 109 are connected by 4 weft yarns $T_5$ to $T_8$.

In other words, the fact that the weft yarns $T_1$ to $T_4$ do not extend into the layers of warp yarns of the woven portion 114 and that the weft yarns $T_5$ to $T_8$ do not extend into the layers of warp yarns of the woven portion 113 ensures the separation 106 which separates the woven portions 113 and 114.

Once the weaving is finished, the non-woven yarns present around the fibrous blank 100 are cut in order to extract the blank, then the root portion of the blank is shaped.

In the example described here, the shaping of the root portion 112 is carried out by separating the woven portions 113 and 114 and introducing a spar 130 into the inner recess 140 formed by the separation 106, as illustrated in FIG. 3. The spar 130 comprises an aerodynamic profile shaping portion 131 which is positioned in an upper portion or base 140a of the recess 140 present in the aerodynamic profile portion 111 of the fibrous blank 100. The spar 130 also comprises a root shaping portion 132 which is positioned in a lower portion or start 140b of the recess 140 present in the root portion 112 of the fibrous blank 100. The recess 140 extends at its lower portion 140b and in the transverse direction $D_T$ over a width $I_{140}$ which is greater than the final diameter of the propeller blade or airfoil root to be produced, as explained below. The width $I_{140}$ corresponds to the width $I_{106}$ of the separation 106 in the fibrous blank 100 (FIG. 1). Such a width is necessary in order to allow the passage of the aerodynamic profile shaping portion 111 through the lower portion 140b of the recess 140. The root shaping portion 132 of the spar 130 has an elongated shape in the transverse direction $D_T$ in order to adapt to the width $I_{140}$ of the recess in the lower portion 140b of the recess, in particular in order to control the maintenance of the shape of the preform in the injection tool.

The spar 130 can be made of various materials. In particular, it can be made from composite material comprising a fibrous reinforcement obtained by three-dimensional weaving or stacking of two-dimensional fibrous plies, and densified by a matrix. The spar can also be made from metal material.

In the example described here, a shaping part 150 made of rigid cellular material, such as a rigid foam for example, is positioned around the aerodynamic profile shaping portion 131 of the spar.

Thus a fibrous preform 200 is obtained comprising, in the longitudinal direction $D_L$, an aerodynamic profile preform portion 211 and a root preform portion 212 having a bulging shape with an inner recess 240 comprising the spar 130 as shown in FIG. 4. The aerodynamic profile preform portion 211 extends in the transverse direction $D_T$ between a leading edge 211a portion and a trailing edge portion 211b.

The fibrous preform is then densified. The densification of the fibrous preform intended to form the fibrous reinforcement of the part to be manufactured consists of filling the pores of the preform, in all or part of the volume thereof, with the material constituting the matrix. This densification is carried out in known manner, i.e. according to the liquid method (CVL). The liquid method involves impregnating the preform with a liquid composition containing a precursor of the matrix material. The precursor is usually in the form of a polymer, such as a high-performance epoxy resin, optionally diluted in a solvent. The preform is placed in a mould that can be closed in a sealed manner with a recess having the shape of the moulded final blade. The mould is then closed and the matrix precursor liquid (for example a resin) is injected into all of the recess in order to impregnate all of the fibrous part of the preform.

The transformation of the precursor into matrix, i.e. its polymerisation, is carried out by heat treatment, generally by heating the mould, after removal of any solvent and cross-linking of the polymer, the preform always being kept in the mould having a shape corresponding to that of the part to be produced.

In the case of the formation of a carbon ceramic matrix, the heat treatment consists of pyrolysing the precursor in order to transform the matrix into a carbon or ceramic matrix depending on the precursor used and the pyrolysis conditions. By way of example, ceramic liquid precursors, in particular SiC, can be polycarbosilane (PCS) polytitanocarbosilane (PTCS) or polysilazane (PSZ) resins, whereas carbon liquid precursors can be resins with a relatively high coke content, such as phenolic resins. Several consecutive cycles can be carried out from the impregnation up to the heat treatment, in order to achieve the desired degree of densification.

According to an aspect of the invention, in the case, in particular, of the formation of an organic matrix, the densification of the fibrous preform can be carried out by the well known method of resin transfer moulding (RTM). According to the RTM method, the fibrous preform is placed in a mould having the external shape of the parts of be produced. A thermosetting resin is injected into the internal space of the mould, which comprises the fibrous preform. A pressure gradient is generally established in this internal space between the location where the resin is injected and the orifices for removal thereof, in order to control and optimise the impregnation of the preform by the resin.

As illustrated in FIG. 4, the injection of a liquid matrix precursor composition into the fibrous texture and its transformation into matrix are carried out here in an injection tool 300 which comprises a first shell 310 comprising, at its centre, a first imprint 311 corresponding in part to the shape and dimensions of the blade to be produced, and a second shell 320 comprising at its centre a second imprint 321 corresponding in part to the shape and dimensions of the blade to be produced.

Once the tool 300 is closed as illustrated in FIG. 5, the first and second imprints 311 and 321 of the first and second shells 310 and 320 respectively, together define an internal volume 301 having the shape of the blade to be produced and in which the fibrous preform 200 is placed. A compacting of the fibrous preform 200 can be carried out with the closure of the tool 300 in order to obtain a determined fibre content in the preform. In this case, a compacting pressure is applied on the shells 310 and 320, for example by means of a press. The compacting of the fibrous preform can also be carried out in a separate tool before the introduction of the preform into the injection tool.

The tool 300 further comprises means for injecting a liquid matrix precursor and for the transformation of this precursor into matrix. More precisely, in the example described here, the first shell 310 of the tool 300 comprises an injection port 313 for injecting a liquid matrix precursor composition into the fibrous preform while the second shell comprises an evacuation port 323 for interacting with a pumping system for placing the tool under vacuum and removing air during injection. The injection tool 300 likewise comprises a lower portion 340 and an upper portion 350 between which the first and second shells 310 and 320 are placed, the lower portion 340 and the upper portion 350 being equipped with heating means (not shown in FIG. 5).

Once the tool 300 is closed, the moulding of the blade proceeds by impregnating the preform 200 with a thermosetting resin that is polymerised by heat treatment. For this purpose, the well known method of resin transfer moulding (RTM) is used. According to the RTM method, a resin 360, for example a thermosetting resin, is injected via the injection port 313 of the first shell 310, into the inner volume occupied by the preform 200. The port 323 of the second shell 320 is connected to an evacuation duct maintained under pressure (not shown in FIG. 6). This configuration enables a pressure gradient to be established between the lower portion of the preform 200 where the resin is injected and the upper portion of the preform located close to the port 323. In this way, the resin 360 substantially injected at the lower portion of the preform will gradually impregnate all of the preform by flowing therein to the evacuation port 323 via which the surplus is evacuated. Of course, the first and second shells 310 and 320 of the tool 300 can comprise a plurality of injection ports and evacuation ports respectively. The RTM method can also be carried out under vacuum (VA-RTM).

The resin used can be, for example, an epoxy resin with a temperature class of 180° C. The resins suitable for RTM methods are well-known. They preferably have a low viscosity in order to facilitate their injection into the fibres. The choice of the temperature class and/or the chemical nature of the resin is determined as a function of the thermomechanical stresses to which the part must be subjected. Once the resin is injected into the entire reinforcement, its polymerisation proceeds by heat treatment according to the RTM method.

The densification methods described above make it possible to produce, from the fibrous preform of the invention, mainly propeller blades or airfoils made of composite material with organic matrix (CMO), carbon matrix (C/C) and ceramic matrix (CMC).

After injection, polymerisation and demoulding, an intermediate part is obtained, as illustrated in FIG. 6, made of composite material 20 having a fibrous reinforcement constituted by the fibrous preform 200 densified by the matrix, the intermediate part 20 comprising an aerodynamic profile portion 21 and a root portion 22.

The root portion 22 is then machined from the intermediate part made from composite material 20 having a determined radius $R_U$ which defines a machining contour $C_U$ in such a way as to form a root having a rotationally symmetric shape. The root portion 22 is then machined in order to remove the material present outside of the machining contour $C_U$ and to form a root of rotationally symmetric shape. It can be seen in FIG. 6 that a part of the root shaping portion 132 of the spar 130 extends beyond the machining contour $C_U$. The machining therefore consists here of removing the portion of densified fibrous preform present outside of the machining contour $C_U$ as well as the part of the root shaping portion 132 of the spar 130 also present outside of the contour $C_U$.

Finally, the blade is trimmed in order to remove the excess resin and the chamfers are machined. No other machining is necessary since, as the part is moulded, it meets the required dimensions.

As illustrated in FIG. 7, a blade 10 is obtained formed of a matrix-densified fibrous reinforcement which comprises, in its lower portion, a root 12 formed by the machined root preform portion 212 and an airfoil 11 formed by the airfoil preform portion 211 of the fibrous preform 200. The blade 10 has a leading edge 11a and a trailing edge 11b corresponding retrospectively to the leading edge 211a and trailing edge 211b portions of the fibrous preform 200. The root 12 comprises a cavity 14 formed by the inner recess 240 of the fibrous preform 200, the cavity 14 comprising the spar 130 bonded to the inside of said cavity 14, the aerodynamic profile shaping portion 131 of the spar 130 being present and bonded in a first portion 142 of the cavity 14 corresponding to the upper portion 140a of the recess 140 present in the aerodynamic profile portion 111 of the fibrous blank 100, while the root shaping portion 132 of the spar 130 is present and bonded in a second portion 141 of the cavity 14 corresponding to the lower portion 140b of the recess 140 present in the root portion 112 of the fibrous blank 100.

As can be seen in FIG. 7, the root shaping portion 132 of the spar 13 is exposed at the leading edge 12a and the trailing edge 12b of the root of the propeller blade or airfoil, the remainder of the root shaping portion of the spar being covered by the densified fibrous preform. This partial exposure of the spar at the propeller blade or airfoil root results from the machining of the root portion 22 of the intermediate part 20 with a diameter less than the excess width of the separation 106 at the portion of the fibrous blank 100 intended to form the propeller blade or airfoil root. However, due to the elongate shape of the root shaping portion 132 of the spar 130, the majority of the outer perimeter of the root 12 is formed by the root preform portion 212 of the fibrous preform 200. By preserving most of the fibrous reinforcement on the outer perimeter of the root 12, the strength of the propeller blade or airfoil is improved in this zone which is subject to large bending forces due to the aerodynamic loads of the propeller blade or airfoil. Since the fibrous reinforcement has a continuous three-dimensional weave from the root to the tip of the aerodynamic profile, it is ideally suitable for transferring local forces to the remainder of the propeller blade or airfoil and thus increasing its mechanical strength.

In the example described above, a shaping part made of rigid cellular material is positioned around the aerodynamic profile shaping portion of the spar. The use of such a shaping part is however optional, the spar being able to have a shape suitable for filling the entire volume of the inner recess present in the aerodynamic profile portion. The use of an additional shaping part made of rigid cellular material can reduce the overall mass of the propeller blade or airfoil. The shaping part can also be produced in situ around the aerodynamic profile shaping portion by injecting an expansive material. In this case, dissolvable filler elements such as salt cores are temporarily positioned in the fibrous preform before injection of the matrix. Once the intermediate part has been produced, in other words, after densification of the fibrous preform, the filler elements are removed and an expansive material is injected into the free volume.

The invention claimed is:

1. A method for manufacturing a propeller blade or airfoil for a turboprop engine made from composite material comprising a matrix-densified fibrous reinforcement, the method comprising:
producing a fibrous blank in a single piece by three-dimensional weaving, the fibrous blank having a flat shape extending in a longitudinal direction and a transverse direction respectively corresponding to the direction of its span between a lower portion and an upper portion and in the chord direction of the propeller blade or airfoil to be manufactured, the fibrous blank comprising a root portion and an aerodynamic profile portion extending in the longitudinal direction from the root portion and in the transverse direction between a leading-edge portion and a trailing-edge portion,
shaping the fibrous blank to obtain a single-piece fibrous preform having said aerodynamic profile portion forming an aerodynamic profile preform and said root portion forming a root preform, and
densification of the fibrous preform by a matrix to obtain an intermediate part made of composite material having a fibrous reinforcement constituted by the fibrous preform and densified by the matrix, the intermediate part comprising an aerodynamic profile portion and a root portion,
wherein the root portion of the fibrous blank comprises a separation delimiting an inner recess extending both into the root portion and into the aerodynamic profile portion of the fibrous blank, the separation extending in the transverse direction between the leading-edge and the trailing-edge of the fibrous blank and set back from said leading-edge and trailing-edge so as to preserve linking portions that are respectively adjacent to the leading-edge and the trailing-edge of the fibrous blank, the inner recess opening at the lower portion of the fibrous blank, wherein the shaping of the fibrous blank comprises the insertion of a spar in the inner recess, the spar comprising an aerodynamic profile shaping portion positioned in the aerodynamic profile portion of the fibrous blank and a root shaping portion positioned in the root portion of the fibrous blank in such a way as to respectively form an aerodynamic profile preform portion and a root preform portion, and, after the densification, machining the root portion of the intermediate part made of composite material along a determined radius in such a way as to form a propeller blade or airfoil comprising a root having a rotationally symmetric shape and an aerodynamic profile.

2. The method according to claim 1, wherein the separation present in the root portion of the fibrous blank and the root shaping portion of the spar have, in the transverse direction, a width greater than the machining radius of the root portion of the intermediate part made from composite material.

3. The method according to claim 1, wherein the spar is made from composite material comprising a matrix-densified fibrous reinforcement or is made of metal material.

4. The method according to claim 1, wherein the shaping of the fibrous blank further comprises the insertion of a shaping part made of rigid cellular material around the aerodynamic profile shaping portion of the spar.

5. The method according to claim 1, wherein the shaping of the fibrous blank further comprises the injection of an expansive material around the aerodynamic profile shaping portion of the spar.

6. A propeller blade or airfoil for a turboprop engine made from composite material comprising a matrix-densified fibrous reinforcement, the propeller blade or airfoil comprising, in a direction of its span, a root and an aerodynamic profile, the root and the aerodynamic profile extending in a chord direction between a leading edge and a trailing edge, the fibrous reinforcement comprising a fibrous preform having a three-dimensional weave with a root preform portion present in the root and an aerodynamic profile preform portion present in the aerodynamic profile, the preform portions of root and aerodynamic profile being connected to one another by the three-dimensional weave, wherein the fibrous preform comprises a separation delimiting an inner recess opening at the root preform portion, the recess forming a cavity extending both into the root and into the aerodynamic profile, the separation extending in the chord direction between a front edge and a rear edge of the fibrous reinforcement, which correspond to, respectively, the leading-edge and the trailing-edge of the propeller blade or airfoil, and the separation being set back from said front and read edges of the fibrous reinforcement so as to preserve linking portions that are respectively adjacent to the front edge and the rear edge, wherein a spar is present in the cavity, the spar comprising an aerodynamic profile shaping portion positioned in a first portion of the cavity and a root shaping portion positioned in a second portion of the cavity, and wherein the root of the propeller blade or airfoil has a rotationally symmetric shape.

7. The propeller blade or airfoil according to claim 6, wherein the root shaping portion of the spar is exposed at the leading edge and the trailing edge of the root of the propeller blade or airfoil, the remainder of the root shaping portion of the spar being covered by the fibrous preform.

8. The propeller blade or airfoil according to claim 6, wherein the spar is made from composite material comprising a matrix-densified fibrous reinforcement or is made of metal material.

9. An aeronautical engine comprising a plurality of propeller blades or airfoils according to claim 6.

10. An aircraft comprising at least one engine according to claim 9.

11. The propeller blade or airfoil according to claim 7, wherein the spar is made from composite material comprising a matrix-densified fibrous reinforcement or is made of metal material.

* * * * *